United States Patent Office 3,448,411
Patented June 3, 1969

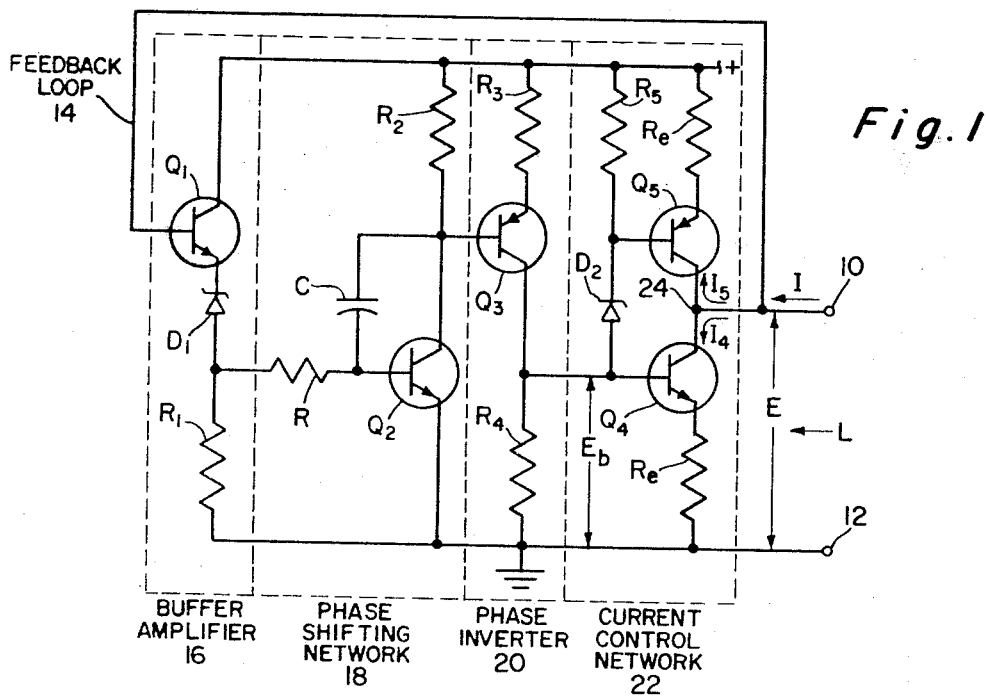
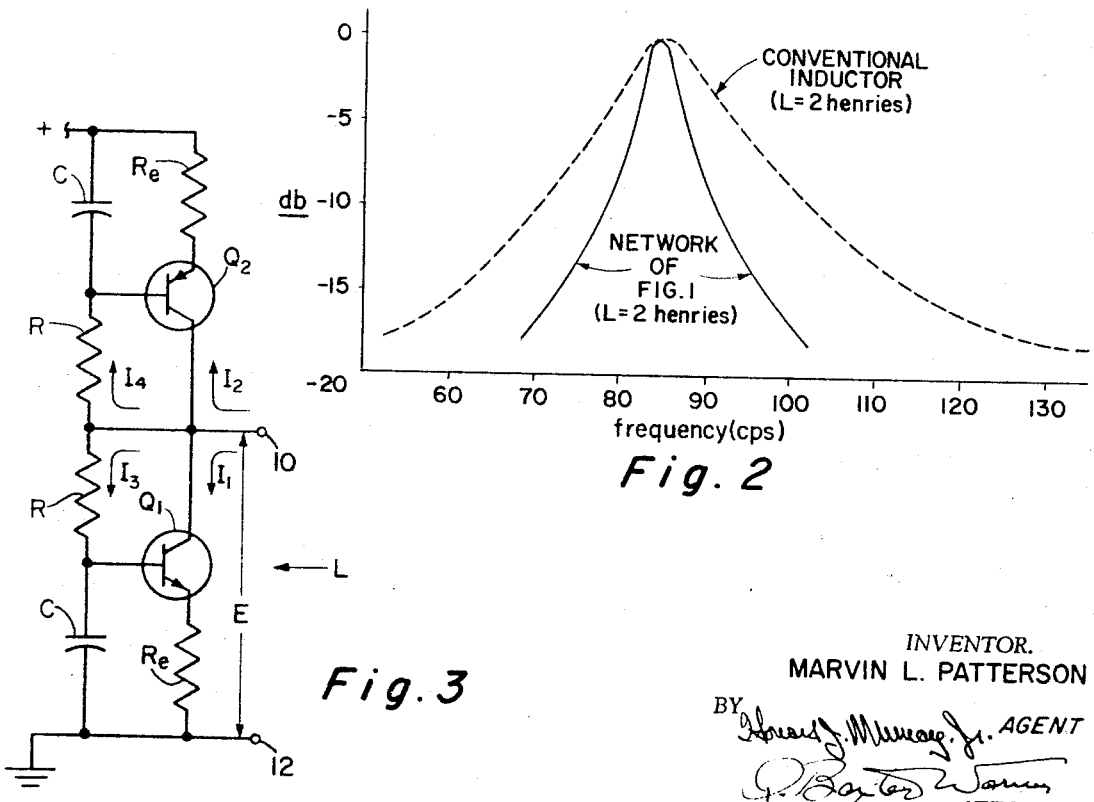

3,448,411
SYNTHETIC INDUCTOR COMPRISING A PHASE-SHIFTING NETWORK FOR SYNTHESIZING THE INDUCTANCE
Marvin L. Patterson, 3975 Vincente,
Camarillo, Calif. 93010
Filed Mar. 23, 1967, Ser. No. 625,930
Int. Cl. H01p 1/24
U.S. Cl. 333—80                                    5 Claims

ABSTRACT OF THE DISCLOSURE

A circuit for simulating the electrical characteristics of a conventional air-core or iron-core inductance coil, the invention arrangement being made up solely of resistors, capacitors, and active elements such as transistors. These components are capable of being micro-miniaturized into a unit of greatly reduced overall size and weight as compared to a standard inductor, particularly at low frenquencies. Not only is the "Q" of the invention circuit higher than that of the member which it replaces, but the former is more versatile in that its output inductance can be varied over a relatively wide range.

---

The invention described herein may be manufactured and used by or for the Government of the United States of America for governmental purposes without the payment of any royalties thereon or therefor.

Background of the invention

A majority of the techniques developed for the design of electrical filters involve the use of the three passive circuit elements—resistors, capacitors and inductors. In general, arrangements in the frequency realm below 1,000 c.p.s. require the amployment of relatively large values of L and C to achieve the desired result. Hence, the physical size of these components becomes significant as a design consideration.

Due principally to recent advances in tantalum technology, large values of capacitance can now be embodied in extremely small "packages," so that their use in low-frequency filters poses no particular problem. However, inductors still tend to increase in size and decrease in quality as their frequency of operation is reduced. This imposes a severe limitation on the microminiaturization of low frequency filters, which otherwise contain only components (resistors, capacitors and transistors) readily susceptible to fabrication in compact form. The present concept is directed to an assembly which simulates the electrical properties of an inductor without incorporating therein an actual inductance coil per se.

Summary of the invention

The present concept utilizes a phase-shifting network to develop a phase angle of approximately 90° between an applied voltage and the induced current, thereby simulating the action of an inductance coil while employing only resistors, capacitors and transistors in a circuit arrangement which is substantially free of such instabilities as could produce undesired oscillations.

One object of the invention is to provide an electrical network which, while including no inductance coil per se, nevertheless simulates the electrical properties of such a component.

Another object of the invention is to provide a simulated inductor which is stable in operation and possesses a relatively high Q factor.

Other objects, advantages, and novel features of the invention will become apparent from the following detialed description of the invention when considered in conjunction with the accompanying drawing wherein:

Brief description of the drawing

FIG. 1 is a schematic circuit diagram of an electrical network embodying a preferred form of the present invention.

FIG. 2 is a set of parallel resonance curves for a conventional inductor and for the circuit of FIG. 1, respectively FIG. 3 is a schematic circuit diagram of an alternative form of the present invention.

Descripition of the preferred embodiment

In FIG. 1 of the drawing is set forth a preferred circuit arrangement for simulating the electrical properties of an inductance coil per se. The terminals 10, 12 are those across which the simulated inductance appears, and provide means whereby the unit to be described may be incorporated into any circuit design with which it is to be associated.

A varying voltage appearing at terminal 10 is applied over a feedback loop 14 to a buffer amplifier 16. The latter includes a transistor $Q_1$, a diode $D_1$, and a resistor $R_1$, all connected in series as shown between ground and a source of positive operating potential.

The voltage appearing between diode $D_1$ and resistor $R_1$ is applied through a resistor R to the base electrode of a further transistor $Q_2$. The latter, along with resistor R, capacitor C, and a further resistor $R_2$, comprise a phase-shifting network identified by the reference numeral 18 in the drawing.

A phase inverter 20 is made up of a still further transistor $Q_3$ and two additional resistors $R_3$ and $R_4$, all series-connected across the operating potential source. The base electrode of the transistor $Q_3$ is connected to a point between resistor $R_2$ and the collector electrode of transistor $Q_2$, as illustrated. The capacitor C is connected between this same point and the base electrode of $Q_2$.

The voltge developed between resistor $R_4$ and the collector electrode of transistor $Q_3$ is applied to a current-control network 22. This network includes two still further transistors $Q_4$ and $Q_5$, each of which has an identical resistor $R_e$ connected to its emitter electrode. In addition, the respective base electrodes of the transistors $Q_4$ and $Q_5$ are interconnected by a diode $D_2$, while a resistor $R_5$ joins the base electrode of transistor $Q_5$ to the source of operating potential. The circuit is completed by means of a connection between terminal 10 and the two interconnected collector electrodes of transistors $Q_4$ and $Q_5$.

Before describing the operation of the circuit of FIG. 1, it should be borne in mind that an inductor possesses certain electrical properties which set it apart from other passive circuit components. These properties can best be understood by considering the nature of the current which is induced by the application of a sinusoidal voltage. This inductive current in unique in that—(1) its magnitude is inversely proportional to the frequency of the applied voltage, and (2) its phase lags behind that of the applied voltage by 90 electrical degrees. Expressing this in vector notation:

$$I = \frac{E}{j\omega L} = \frac{E}{\omega L} \angle -90° \tag{1}$$

where

I=induced current
E=applied voltage
ω=angular frequency of applied voltage in radians
L=inductance To recognize the manner in which the circuit of FIG. 1 exhibits these properties, and hence appears in an electrical sense precisely as if it were a conventional inductor, it is helpful to analyze its response to an applied sinusoidal voltage E. This input voltage E between terminals 10 and 12 appears on the base electrode of emitter follower $Q_1$ and hence across resistor $R_1$. The Zener diode $D_1$ is in reverse conduction and thus appears as a short circuit to the A-C signal E. Transistor $Q_2$ acts in effect as an operational amplifier with feedback elements and has a voltage gain G of approximately:

$$G \cong -\frac{\text{Feedback impedance}}{\text{Input impedance}} = \frac{-1}{j\omega RC} \quad (2)$$

or $$G_1 = \frac{-1}{\omega RC} \angle -90° \quad (3)$$

Inverter $Q_3$ has a voltage gain of approximately:

$$G_2 = -R_4 R_5 / (R_4 + R_5) R_3 \quad (4)$$

Therefore, the voltage appearing across $R_4$ will be:

$$E_b = E(G_1)(G_2) = E\left(\frac{-1}{j\omega RC}\right)\frac{-R_4 R_5}{(R_4 + R_5) R_3} \quad (5)$$

If the magnitude of $G_2$ is set equal to minus 1:

$$E_b = \frac{E}{j\omega RC} = \frac{E}{\omega RC} \angle -90° \quad (6)$$

Since Zener diode $D_2$ is in reverse conduction, $E_b$ appears at the bases of both $Q_4$ and $Q_5$. The A-C currents that flow into the collectors of these two transistors are:

$$I_4 = I_5 = E_b / R_e \quad (7)$$

The sum of these currents must equal I so:

$$I = I_4 + I_5 = 2E_b / R_e \quad (8)$$

Since Equation 6 states that:

$$E_b = \frac{E}{\omega RC} \angle -90°$$

it follows that:

$$I = \frac{2E}{\omega R R_e C} \angle -90° \quad (9)$$

Comparing this with Equation 1 shows that an inductance of:

$$L = R R_e C / 2 \quad (10)$$

has been synthesized.

The above discussion is somewhat idealized in that the phase angle between E and I closely approaches but never reaches 90°. However, this is also true of conventional inductance coils. A quality factor Q may be defined as:

$$Q = \tan \theta$$

where $\theta$ is the phase angle between E and I. This factor represents a measure of the difference between the actual device and an ideal inductor, so that a higher Q designates a closer approximation to the desired condition.

The buffer amplifier 16 of FIG. 1 serves primarily to isolate the output variation appearing across terminals 10, 12 from the loading effect of the phase shifter 18. The latter, which includes the high-gain transistor $Q_2$, produces a phase shift of essentially 90° across capacitor C. A further phase inversion of 180° results from the action of network 20.

The two transistors $Q_4$ and $Q_5$ of the current-control network 22, each of which has associated therewith a resistor $R_e$, are connected in series between the operating potential source and ground. The voltage appearing across resistor $R_4$($E_b$) also appears on the base electrodes of both transistors $Q_4$ and $Q_5$, since $D_2$ is in reverse conduction. The resulting current into the point 24 between transistor $Q_4$ and $Q_5$ is thus as set forth in Equation 8.

It should be noted that all units of the network of FIG. 1 are D-C coupled and hence form a negative feedback D-C loop. The use of the Zener diodes $D_1$ and $D_2$ regulates the D-C bias conditions so that each transistor operates linearly. Furthermore, the negative feedback provides a self-correcting action which maintains these bias conditions stable over a wide range of operating temperatures and power supply fluctuations.

Inasmuch as only a single capacitor is employed in the circuit of FIG. 1, a maximum phase shift of 90° can occur. Although a circuit with a feedback loop under certain conditions has a tendency to generate oscillations, the employment of only a single capacitor precludes such oscillations from developing and adds stability to the network.

A circuit designed in accordance with the showing of FIG. 1 has produced an inductance of 1.6 henries and a Q of 73 at a frequency of 100 c.p.s. This represents a marked improvement over available conventional inductors. At a lower Q of 18 at the same frequency, as high as 8 henries has been obtained.

The value of the developed inductance is directly dependent upon the values of resistors R, $R_e$, $R_3$, $R_4$ and $R_5$. Hence, potentiometers can be employed to make the range of inductance adjustable within wide limits. This is an advantage over conventional inductors which commonly incorporate a movable iron slug for limited adjustability.

FIG. 2 of the drawings illustrates a pair of characteristic curves at a selected frequency for the circuit of FIG. 1 and for a conventional inductor, respectively. For an output inductance of 2 henries it will be apparent that the curve representing the simulated inductor of the present concept possesses a desirably sharper response.

In FIG. 3 of the drawings is set forth a further embodiment of the present invention. While possessing a lower Q than the network of FIG. 1, it is made up of fewer components and hence may be employed in environments where a high quality factor is not required.

In FIG. 3, an input voltage E of sinusoidal form applied between terminals 10 and 12 will cause currents to flow through both resistors R. If the value of R is much greater than the reactance of C, and if the input impedance to the base electrodes of transistors $Q_1$ and $Q_2$ is also much greater than the reactance of C, then this current flow through R will be approximately:

$$I_f = I_3 = I_4 = E/R \quad (11)$$

The voltage across the two capacitors will be:

$$E_b = X_c I_f = \frac{E}{R}\left(\frac{1}{j\omega C}\right) = \frac{E}{\omega RL} \angle -90° \quad (12)$$

This voltage will cause A-C currents $I_1$ and $I_2$ to flow into the collectors of $Q_1$ and $Q_2$ such that:

$$I_1 = I_2 = \frac{E_b}{R_e} = \frac{E}{\omega R R_e C} \angle -99° \quad (13)$$

The input current to the device, I, due to the input voltage is then:

$$I = I_1 + I_2 = \frac{2E}{\omega R R_e C} \angle -90° \quad (14)$$

neglecting the small currents $I_3$ and $I_4$. Comparing Eqation 14 to Equation 1 shows that, again, a synthetic inductance of approximately.

$$L = R R_e C / 2 \quad (15)$$

has been produced.

The lower Q of the circuit of FIG. 3 results from the loading effects caused by the feedback resistors and the transistor input impedances. An expression for this Q has been developed which states that:

$$Q = \frac{\frac{R_e}{X_c}(R - R_e)}{\frac{R}{B} + R_e + R_2\left(\frac{R_e}{X_c}\right)^2} \quad (16)$$

where:

B = the current gain of transistors $Q_1$ and $Q_2$
$X_c = 1/\omega C$ where $\omega$ = frequency in radians/sec.

As with the circuit of FIG. 1, the biasing of the transistors $Q_1$ and $Q_2$ is accomplished by means of a negative feedback loop to each transistor. Consequently, the bias stability is again high, and the manner in which the capacitors are employed materially reduces the tendency of the circuit to oscillate.

Although the values that are selected for the components of the circuit of FIG. 1 will depend in part upon the value of inductance desired, an output of approximately 2 henries has been obtained in practice when employing the following:

| | |
|---|---|
| $R_1$, $R_3$ | 3.9K |
| $R_2$ | 1K |
| $R_4$ | 3K |
| $R_5$ | 5.1K |
| $D_1$, $D_3$ (type) | IN748A |
| $D_2$ (type) | IN754A |
| Q, $Q_2$, $Q_4$ (type) | 2N2925 |
| $Q_3$, $Q_5$ (type) | 2N3638 |
| R | 3.3K |
| C | 1 μf |
| $R_e$ | 620Ω |

For the circuit of FIG. 3, exemplary values may be as follows for an output of 2.9 henries:

| | |
|---|---|
| R | 68K |
| C | 22 μf |
| $R_e$ | 390Ω |
| $Q_1$ | 2N2925 |
| $Q_2$ | 2N3638A |

Obviously many modifications and variations of the present invention are possible in the light of the above teachings. It is therefore to be understood that the invention may be practiced otherwise than as specifically described.

I claim:

1. A high Q circuit for simulating the electrical characteristics of an inductor, said circuit comprising:
   a source of operating potential;
   a pair of transistors each having emitter, base and collector electrodes;
   means for connecting together the respective collector electrodes of said transistors;
   a pair of resistors;
   means for connecting the emitter electrode of one of said pair of transistors to the positive terminal of said operating potential source through one of said pair of resistors;
   means for connecting the emitter electrode of the other of said pair of transistors to the negative terminal of said operating potential source through the other of said pair of resistors;
   a source of varying signal voltage;
   means for applying the varying signal voltage from said source to the interconnected collector electrodes of said transistors;
   a phase-shifting network; and
   a feedback connection between the joined collector electrodes of said transistors and the respective base electrodes thereof through said phase-shifting network,
   such that the current flowing into said interconnected transistors is essentially 90° out of phase with said varying signal voltage.

2. A circuit according to claim 1 in which said phase-shifting network is effective to shift the phase of an applied voltage by essentially 270°.

3. A circuit according to claim 2, further comprising a buffer amplifier interposed in the feedback connection between the joined collector electrodes of said transistors and the respective base electrodes thereof, said buffer amplifier acting to isolate the source of varying signal voltage from the loading effect of said phase-shifting network.

4. A circuit according to claim 2, further comprising a Zener diode connected between the respective base electrodes of said transistors, and means for biasing said Zener diode to bring about reverse conduction thereof and hence permit application of the energy fed back through said phase-shifting network to the respective base electrodes of both said transistors.

5. A circuit for simulating the electrical characteristics of an inductor, said circuit comprising:
   a source of operating potential;
   a pair of transistors each having emitter, base, and collector electrodes;
   means for connecting together the respective collector electrodes of said transistors;
   a pair of resistors;
   means for connecting the emitter electrode of one of said pair of transistors to the positive terminal of said operating potential source through one of said pair of resistors;
   means for connecting the emitter electrode of the other of said pair of transistors to the negative terminal of said operating potential source through the other of said pair of resistors;
   a source of varying signal voltage;
   a pair of phase-shifting networks respectively associated with said pair of transistors, each phase-shifting network comprising a resistor and a capacitor,
   the resistor of one of said phase-shifting networks being connected between the collector electrode of the transistor with which it is associated and the base electrode of such transistor,
   the capacitor of said one phase-shifting network being connected between the base electrode of the transistor with which it is associated and the positive terminal of the said operating potential source,
   the resistor of the other of said phase-shifting networks being connected between the collector electrode of the transistor with which it is associated and the base electrode of such transistor,
   the capacitor of said other phase-shifting network being connected between the base electrode of the transistor with which it is associated and the negative terminal of the said operating potential source; and
   means for applying the varying signal voltage from said source to the interconnected collector electrodes of said transistors,
   whereby the current flowing into said interconnected transistors is essentially 90° out of phase with said varying signal voltage.

References Cited

UNITED STATES PATENTS 2,726,370    12/1955    Linvill et al.

HERMAN KARL SAALBACH, *Primary Examiner.*

PAUL L. GENSLER, *Assistant Examiner.*

U.S. Cl. X.R.

307—295, 318